(No Model.)

J. BEATTIE, Jr.
SECONDARY BATTERY.

No. 388,335. Patented Aug. 21, 1888.

WITNESSES:

INVENTOR.
John Beattie Jr.
BY
ATTORNEY.

UNITED STATES PATENT OFFICE.

JOHN BEATTIE, JR., OF WESTPORT, MASSACHUSETTS.

SECONDARY BATTERY.

SPECIFICATION forming part of Letters Patent No. 388,335, dated August 21, 1888.

Application filed May 2, 1887. Serial No. 236,826. (No model.)

*To all whom it may concern:*

Be it known that I, JOHN BEATTIE, Jr., a citizen of the United States, residing in Westport, in the county of Bristol and State of Massachusetts, have invented certain new and useful Improvements in Secondary Batteries; and I do hereby declare that the following is a full, clear, and exact description of my invention, such as will enable others skilled in the art to which it appertains to make and use the same.

The invention herein described has reference to secondary or storage batteries.

The object is to furnish a battery which shall be of longer life than any heretofore known—in other words, whose plates or elements shall have the quality of withstanding to a great degree the corrosive action of the electrolytic fluid.

A further object is to increase the facility with which battery-connections may be made, and to provide for handling and transporting batteries without danger of displacing the plates.

Figure 1:
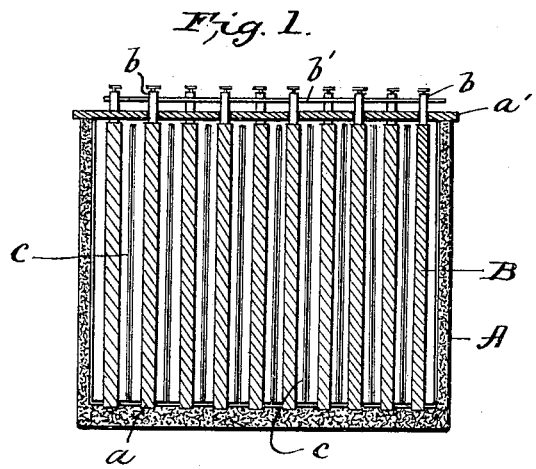
Figure 2:
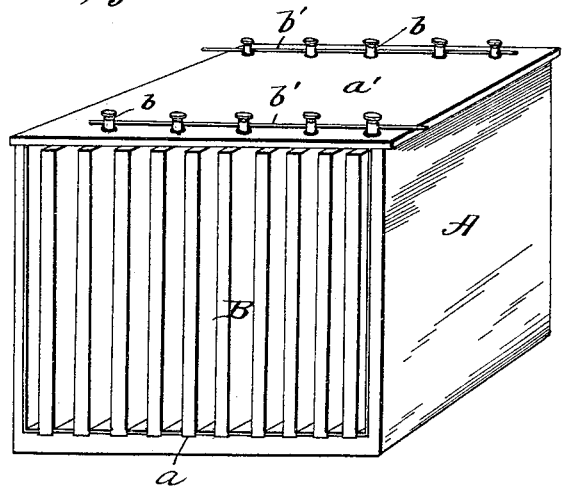

In the accompanying drawings, Figure 1 represents a vertical section of my improved battery, and Fig. 2 a sectional perspective of same.

I will proceed to describe the mechanical portions of my invention.

I propose to construct the box or vessel A of wood pulp, papier-maché, or some similar material, in order that it may be made without joints or seams. It is to be understood, however, that the box may be constructed of wood, terra-cotta, or any other suitable material. The bottom of the box is to be provided with parallel grooves, as shown at $a$, for the plates B to rest and fit into. The plates are to extend up within a short distance of the cover $a'$, so that the cover may prevent the plates from getting out of the grooves whenever the battery is subjected to jarring or rough handling. I prefer to line the vessel with three layers of material—first a layer of asphaltum or similar substance, next sheet-tin, and finally another layer of asphaltum. The plates B are each provided with a binding-post, $b$, which is cast integral therewith and of the same material. They extend above the plates a considerable distance and project through perforations in the cover $a'$. When inserting the lead and zinc plates into the box, I arrange them so that the posts of each set shall be in a row at the opposite ends of the box. Each post is provided with a hole bored or otherwise formed laterally through it and with a set-screw in the top. The posts of each set of plates are connected together by rods or wires $b'$, which pass through the lateral holes in the post and are secured in by the set-screw. The rod may have any kind of coupling at one end for connection with the line. For purposes of getting good connections between the parts the borings in the posts and the contact portions of the rods may be coated with an amalgam. The plates are held apart and in place by the grooves in the bottom of the box and by the cover which embraces the binding-posts; but as a further preventive of contact between the plates I propose to insert between them strips of mica, $c$, or wax re-enforced by mica. Two or three of such strips would ordinarily be sufficient for the purpose.

Leaving the mechanical features of my invention, I will describe my improvement in the battery-plates.

The zinc plate is made substantially according to the process described in Patent No. 359,835, issued to me March 22, 1887—that is to say, the plate is a compound of zinc, mercury, lead or tin, and sodium. Where lead is used in this compound, I also add arsenic; but if tin is used in place of lead the arsenic is omitted. Any suitable proportions may be followed; but I will mention from five to sixteen per cent. of mercury, one to eight per cent. of sodium, three to sixteen per cent. of lead or tin, and where lead is used one-tenth per cent. to three-tenths per cent. of arsenic, the balance, as it may be, of zinc. The lead plates consist of a compound of lead, arsenic, sodium, and mercury united in about the following proportions, to wit: one-tenth to three-tenths per cent. of arsenic, one to five per cent. of sodium, two to sixteen per cent. of mercury, and the balance, as it may be, of lead. The different materials composing the compound in each case are to be thoroughly mixed, in the manner set forth in the above-mentioned Letters Patent, and amalgamated by heat, so that the plates will be of the same nature throughout the whole body. The lead plate is made porous by any of the well-known methods. I would suggest repeated immersion in nitric acid as one way of doing it.

I claim as my invention—

1. In a secondary battery, a plate composed of lead and an amalgam of any metal except lead in combination with a plate composed of zinc and an amalgam of any metal except zinc, for the purpose set forth.

2. In a secondary battery, a plate amalgamated throughout its entire body with an amalgam of lead and any other metal except lead in combination with a plate amalgamated throughout its entire body with an amalgam of zinc and any metal except zinc, substantially as set forth.

3. In a secondary battery, a lead plate consisting of an amalgam of lead, arsenic, sodium, and mercury, in combination with a zinc plate composed of an amalgam of zinc, mercury, lead or tin, and sodium, substantially as set forth.

In witness whereof I have hereunto signed my name in the presence of two subscribing witnesses.

JOHN BEATTIE, JR.

Witnesses:
AUGUSTUS MERRITT,
WM. W. ROSENBAUM.